(12) United States Patent
Liu et al.

(10) Patent No.: US 7,611,276 B2
(45) Date of Patent: Nov. 3, 2009

(54) PERFORMANCE TESTING APPARATUS FOR HEAT PIPES

(75) Inventors: Tay-Jian Liu, Tu-Cheng (TW);
Chuen-Shu Hou, Tu-Cheng (TW);
Chao-Nien Tung, Tu-Cheng (TW);
Qian-Hua He, Shenzhen (CN)

(73) Assignees: Fu Zhun Precision Industry (Shen Zhen) Co., Ltd., Shenzhen, Guangdong Province (CN); Foxconn Technology Co., Ltd., Tu-Cheng, Taipei Hsien (TW)

( * ) Notice: Subject to any disclaimer, the term of this patent is extended or adjusted under 35 U.S.C. 154(b) by 343 days.

(21) Appl. No.: 11/309,599

(22) Filed: Aug. 29, 2006

(65) Prior Publication Data
US 2007/0195854 A1    Aug. 23, 2007

(30) Foreign Application Priority Data
Feb. 18, 2006    (CN)    ........................ 2006 1 0033842

(51) Int. Cl.
*G01K 1/16*    (2006.01)
*G01N 25/00*    (2006.01)

(52) U.S. Cl. ........................... 374/44; 374/29; 374/137; 374/147; 374/5; 374/57; 374/208

(58) Field of Classification Search ................. 374/4, 374/5, 29–32, 43–44, 57, 137, 147, 152, 374/153, 141, 145, 179, 208
See application file for complete search history.

*Primary Examiner*—Gail Verbitsky
(74) *Attorney, Agent, or Firm*—Frank R. Niranjan (57) ABSTRACT

A performance testing apparatus for a heat pipe includes an immovable portion having a first heating member located therein for heating an evaporating section of a heat pipe requiring testing. A movable portion is capable of moving relative to the immovable portion and has a second heating member located therein for heating the evaporating section of the heat pipe. A receiving structure is defined between the immovable portion and the movable portion for receiving the evaporating section of the heat pipe therein. Temperature sensors are attached to the immovable portion and the movable portion for detecting temperature of the heat pipe. An enclosure encloses the immovable portion and the movable portion therein and has sidewalls thereof slidably contacting at least one of the immovable portion and the movable portion.

15 Claims, 6 Drawing Sheets

PERFORMANCE TESTING APPARATUS FOR HEAT PIPES

FIELD OF THE INVENTION

The present invention relates generally to testing apparatuses, and more particularly to a performance testing apparatus for heat pipes.

DESCRIPTION OF RELATED ART

It is well known that a heat pipe is generally a vacuum-sealed pipe. A porous wick structure is provided on an inner face of the pipe, and phase changeable working media employed to carry heat is included in the pipe. Generally, according to where the heat is input or output, a heat pipe has three sections, an evaporating section, a condensing section and an adiabatic section between the evaporating section and the condensing section.

In use, the heat pipe transfers heat from one place to another place mainly by exchanging heat through phase change of the working media. Generally, the working media is a liquid such as alcohol or water and so on. When the working media in the evaporating section of the heat pipe is heated up, it evaporates, and a pressure difference is thus produced between the evaporating section and the condensing section in the heat pipe. The resultant vapor with high enthalpy rushes to the condensing section and condenses there. Then the condensed liquid reflows to the evaporating section along the wick structure. This evaporating/condensing cycle continually transfers heat from the evaporating section to the condensing section. Due to the continual phase change of the working media, the evaporating section is kept at or near the same temperature as the condensing section of the heat pipe. Heat pipes are used widely owing to their great heat-transfer capability.

In order to ensure the effective working of the heat pipe, the heat pipe generally requires testing before being used. The maximum heat transfer capacity (Qmax) and the temperature difference ($\Delta T$) between the evaporating section and the condensing section are two important parameters in evaluating performance of the heat pipe. When a predetermined quantity of heat is input into the heat pipe through the evaporating section thereof, thermal resistance (Rth) of the heat pipe can be obtained from $\Delta T$, and the performance of the heat pipe can be evaluated. The relationship between these parameters Qmax, Rth and $\Delta T$ is Rth=$\Delta T$/Qmax. When the input quantity of heat exceeds the maximum heat transfer capacity (Qmax), the heat cannot be timely transferred from the evaporating section to the condensing section, and the temperature of the evaporating section increases rapidly.

A typical method for testing the performance of a heat pipe is to first insert the evaporating section of the heat pipe into a liquid at constant temperature; after a period of time the temperature of the heat pipe will become stable, then a temperature sensor such as a thermocouple, a resistance thermometer detector (RTD) or the like can be used to measure $\Delta T$ between the liquid and the condensing section of the heat pipe to evaluate the performance of the heat pipe. However, Rth and Qmax can not be obtained by this test, and the performance of the heat pipe can not be reflected exactly by this test.

Figure 6:
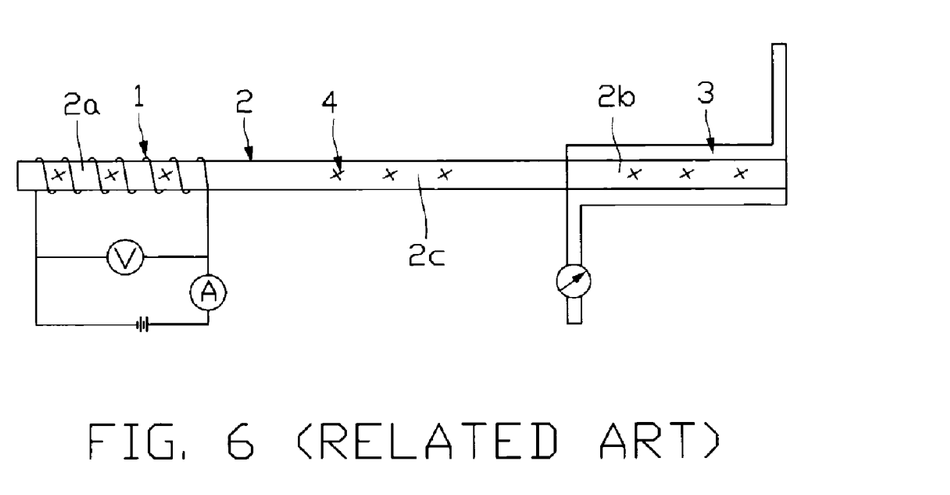
FIG. 6 is a performance testing apparatus for heat pipes in accordance with related art.

Referring to FIG. 6, a related performance testing apparatus for heat pipes is shown. The apparatus has a resistance wire 1 coiling round an evaporating section 2a of a heat pipe 2, and a water cooling sleeve 3 functioning as a heat sink and enclosing a condensing section 2b of the heat pipe 2. In use, electrical power controlled by a voltmeter and an ammeter flows through the resistance wire 1, whereby the resistance wire 1 heats the evaporating section 2a of the heat pipe 2. At the same time, by controlling flow rate and temperature of cooling liquid entering the cooling sleeve 3, the heat input at the evaporating section 2a can be removed from the heat pipe 2 by the cooling liquid at the condensing section 2b, whereby a stable operating temperature of adiabatic section 2c of the heat pipe 2 is obtained. Therefore, Qmax of the heat pipe 2 and $\Delta T$ between the evaporating section 2a and the condensing section 2b can be obtained by temperature sensors 4 at different positions on the heat pipe 2.

However, in the test, the related testing apparatus has the following drawbacks: a) it is difficult to accurately determine lengths of the evaporating section 2a and the condensing section 2b which are important factors in determining the performance of the heat pipe 2; b) heat transference and temperature measurement may easily be affected by environmental conditions; and, c) it is difficult to achieve sufficiently intimate contact between the heat pipe and the heat source and between the heat pipe and the heat sink, which results in uneven performance test results of the heat pipe. Furthermore, due to awkward and laborious assembly and disassembly in the test, the testing apparatus can be only used in the laboratory, and can not be used in the mass production of heat pipes.

In mass production of heat pipes, a large number of performance tests are needed, and the apparatus is used frequently over a long period of time; therefore, the apparatus not only requires good testing accuracy, but also requires easy and accurate assembly to the heat pipes to be tested. The testing apparatus affects the yield and cost of the heat pipes directly; therefore, testing accuracy, facility, speed, consistency, reproducibility and reliability need to be considered when choosing the testing apparatus. Therefore, the testing apparatus needs to be improved in order to meet the demand for mass production of heat pipes.

What is needed, therefore, is a high performance testing apparatus for heat pipes suitable for use in mass production of heat pipes.

SUMMARY OF THE INVENTION

A performance testing apparatus for a heat pipe in accordance with a preferred embodiment of the present invention comprises an immovable portion having a heating member located therein for heating an evaporating section of a heat pipe requiring testing. A movable portion is capable of moving relative to the immovable portion and has a second heating member located therein for heating the evaporating section of the heat pipe. A receiving structure is defined between the immovable portion and the movable portion for receiving the evaporating section of the heat pipe therein. At least one temperature sensor is attached to at least one of the immovable portion and the movable portion for thermally contacting the heat pipe in the receiving structure for detecting temperature of the heat pipe. An enclosure encloses the immovable portion and the movable portion therein and has sidewalls thereof slidably contacting at least one of the immovable portion and the movable portion.

Other advantages and novel features will become more apparent from the following detailed description of preferred embodiments when taken in conjunction with the accompanying drawings, in which:

BRIEF DESCRIPTION OF THE DRAWINGS

Many aspects of the present apparatus can be better understood with reference to the following drawings. The components in the drawings are not necessarily drawn to scale, the emphasis instead being placed upon clearly illustrating the principles of the present apparatus. Moreover, in the drawings, like reference numerals designate corresponding parts throughout the several views.

DETAILED DESCRIPTION OF THE INVENTION

Figure 1:
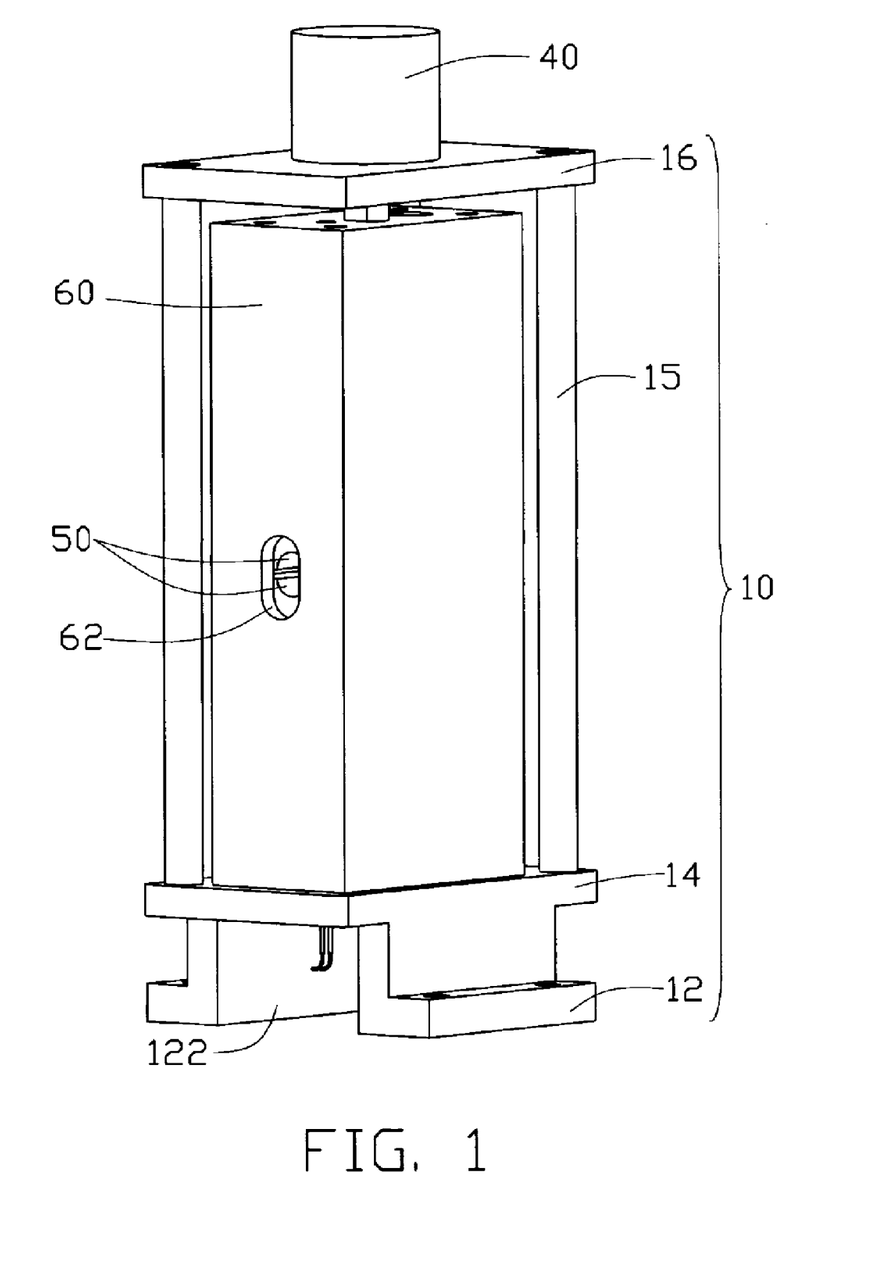
FIG. 1 is an assembled view of a performance testing apparatus for heat pipes in accordance with a preferred embodiment of the present invention.
Figure 2:
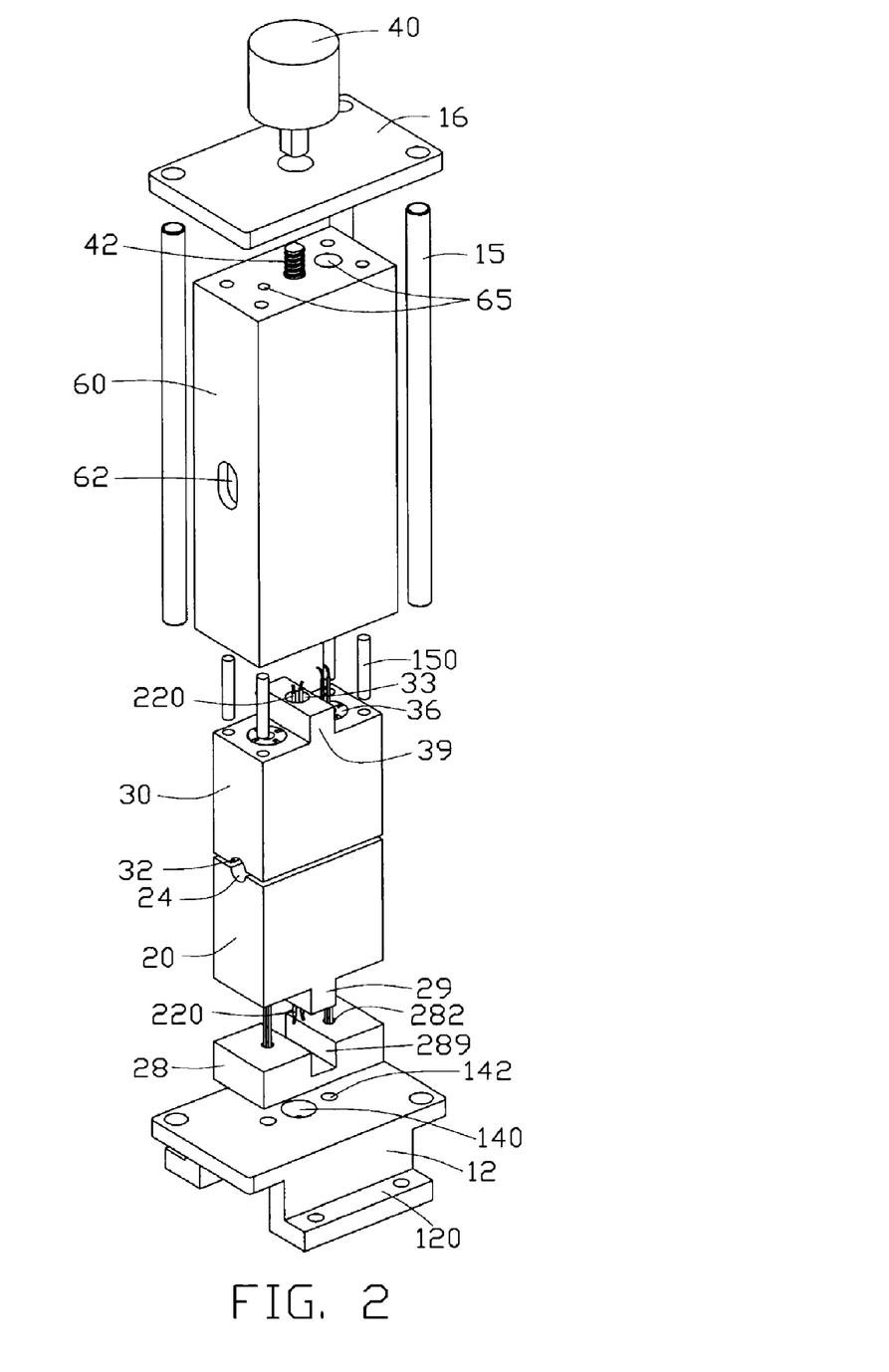
FIG. 2 is an exploded, isometric view of the testing apparatus of FIG. 1.

Referring to FIGS. 1 and 2, a performance testing apparatus for heat pipes comprises an immovable portion 20 and a movable portion 30 movably mounted on the immovable portion 20. The performance testing apparatus is to be held on a platform of a supporting member such as a testing table or so on.

The immovable portion 20 is made of material having good heat conductivity. A first heating member (not shown) such as an immersion heater, resistance coil, quartz tube and Positive temperature coefficient (PTC) material or the like is embedded in the immovable portion 20. The immovable portion 20 has a central portion thereof extending an extension 29 downwardly. The immovable portion 20 defines a hole (not shown) in the extension 29. In this case, the first heating member is an elongated cylinder and is accommodated in the hole of the immovable portion 20. Two spaced wires 220 extend beyond the extension 29 from a bottom end of the first heating member for connecting with a power supply (not shown). The immovable portion 20 has a heating groove 24 defined in a top face thereof, for receiving an evaporating section of the heat pipe to be tested therein. Two temperature sensors (not shown) are inserted into the immovable portion 20 from a bottom thereof so as to position detecting sections (not shown) of the sensors in the heating groove 24. The detecting sections are capable of automatically contacting the heat pipe in order to detect a temperature of the evaporating section of the heat pipe. The sensors are located at two sides of the first heating member, respectively, and each have a pair of wires (not labeled) extending downwardly beyond a bottom face of the immovable portion 20.

The movable portion 30 is also made of material having good heat conductivity. The movable portion 30 has an extension 39 extending upwardly from a middle of a top surface thereof. The movable portion 30 defines a hole 33 in the extension 39. A second heating member (not shown) is accommodated in the hole 33 of the movable portion 30. Two spaced wires 220 extend from a top end of the heating member beyond the extension 39 for connecting with the power supply (not shown). The movable portion 30, corresponding to the heating groove 24 of the immovable portion 20, has a heating groove 32 defined therein, whereby a testing channel 50 is cooperatively defined by the heating grooves 24, 32 when the movable portion 30 moves to reach the immovable portion 20. Thus, an intimate contact between the evaporating section of the heat pipe and the movable and immovable portions 30, 20 defining the channel 50 can be realized, thereby reducing heat resistance between the heat pipe and the movable and immovable portions 30, 20. Two temperature sensors 36 are inserted into the movable portion 30 from a top thereof to reach a position wherein detecting portions (not shown) of the sensors 36 are located in the heating groove 32. The detecting portions are capable of automatically contacting the heat pipe to detect the temperature of the evaporating section of the heat pipe.

The channel 50 as shown in the preferred embodiment has a circular cross section enabling it to receive the evaporating section of the heat pipe having a correspondingly circular cross section. Alternatively, the channel 50 can have a rectangular cross section where the evaporating section of the heat pipe also has a flat rectangular configuration.

In order to ensure that the heat pipe is in close contact with the movable and immovable portions 30, 20, a supporting frame 10 is used to support and assemble the immovable and movable portions 20, 30. The immovable portion 20 is fixed on the supporting frame 10. A driving device 40 is installed on the supporting frame 10 to drive the movable portion 30 to make accurate linear movement relative to the immovable portion 20 along a vertical direction, thereby realizing the intimate contact between the heat pipe and the movable and immovable portions 30, 20. In this manner, heat resistance between the evaporating section of the heat pipe and the movable and immovable portions 30, 20 can be minimized.

The supporting frame 10 comprises a seat 12. The seat 12 comprises a first plate 14 at a top thereof and two feet 120 depending from the first plate 14. A space 122 is defined between the two feet 120 for extension of the wires 220 of the first heating member and the wires of the temperature sensors. The supporting frame 10 has a second plate 16 hovering over the first plate 14. Pluralities of supporting rods 15 interconnect the first and second plates 14, 16 for supporting the second plate 16 above the first plate 14. The seat 12, the second plate 16 and the rods 15 constitute the supporting frame 10 for assembling and positioning the immovable and movable portions 20, 30 therein. The immovable portion 20 is fixed on the first plate 14. In order to prevent heat in the immovable portion 20 from spreading to the first plate 14, a thermally insulating plate 28 is located at the bottom of the immovable portion 20. The insulating plate 28, corresponding to the extension 29 of the immovable portion 20, defines a concave 289 receiving the extension 29 therein. The first plate 14 and the insulating plate 28 define corresponding through holes 140 (the hole in the insulating plate 28 is not shown) for the wires 220 of the first heating member of the immovable portion 20 to extend therethrough to connect with the power supply, and spaced apertures 142, 282 to allow the wires of the temperature sensors to extend therethrough to connect with a monitoring computer (not shown).

In order to ensure that the immovable portion 20 and the movable portion 30 have good linear movement relative to each other, and keep the grooves 24, 32 of the immovable and movable portions 20, 30 in position corresponding to each other, a cuboidal enclosure 60 without a bottom is used to enclose the immovable and movable portions 20, 30 therein. The enclosure 60 is located between the first and second plates 14, 16 of the supporting frame 10. The enclosure 60 has four sidewalls (not labeled) thereof slidably contacting side faces of the immovable portion 20 all along. Corresponding to the channel 50, at least one of a pair of the sidewalls of the enclosure 60 defines an opening 62 for disposing the evaporating section of the heat pipe into the channel 50 therefrom. A bolt 42 is fixed to a center of a top wall (not labeled) of the enclosure 60. Two apertures 65 are defined at two sides of the bolt 42 in the top wall to allow the wires of the temperature sensors 36 and the wires 220 of the second heating member to extend therethrough to connect with the monitoring computer and the power supply. Four columns 150 engage with corresponding corners of the movable portion 30 and the top wall of the enclosure 60, thereby fastening the movable portion 30 and the enclosure 60 together.

The driving device 40 in this preferred embodiment is a step motor, although it can be easily apprehended by those skilled in the art that the driving device 40 can also be a pneumatic cylinder or a hydraulic cylinder. The driving device 40 is installed on the second plate 16 of the supporting frame 10. A shaft (not labeled) of the driving device 40 extends through the second plate 16 of the supporting frame 10. The shaft has a threaded end (not shown) threadedly engaging with the bolt 42 secured on the top wall of the enclosure 60. When the shaft rotates, the bolt 42 with the enclosure 60 and the movable portion 30 move upwardly or downwardly. In use, the driving device 40 accurately drives the movable portion 30 to move linearly relative to the immovable portion 20. For example, the movable portion 30 can be driven to depart a certain distance such as 5 millimeters from the immovable portion 20 to facilitate the insertion of the evaporating section of the heat pipe being tested into the channel 50 or withdrawn from the channel 50 after the heat pipe has been tested. On the other hand, the movable portion 30 can be driven to move toward the immovable portion 20 to thereby realize an intimate contact between the evaporating section of the heat pipe and the immovable and movable portions 20, 30 during the test. Accordingly, the requirements for testing, i.e. accuracy, ease of use and speed, can be realized by the testing apparatus in accordance with the present invention.

It can be understood, positions of the immovable portion 20 and the movable portion 30 can be exchanged, i.e., the movable portion 30 is located on the first plate 14 of the supporting frame 10, and the immovable portion 20 is fixed to the top wall of the enclosure 60, and the driving device 40 is positioned to be adjacent to the immovable portion 20.

In use, the evaporating section of the heat pipe is disposed into the groove 24 of the immovable portion 20 from the opening 62 of the enclosure 60 when the movable portion 30 moves away from the immovable portion 20. Then the movable portion 30 moves to reach the top face of the immovable portion 20 so that the evaporating section of the heat pipe is tightly fitted in the channel 50. The sensors in the immovable portion 20 and the sensors 36 in the movable portion 30 are in thermal contact with the evaporating section of the heat pipe; therefore, the sensors 26, 36 work to accurately send detected temperatures from the evaporating section of the heat pipe to the monitoring computer. Based on the temperatures obtained by the plurality of sensors, an average temperature can be obtained by the monitoring computer very quickly; therefore, performance of the heat pipe can be quickly decided.

Figure 3:
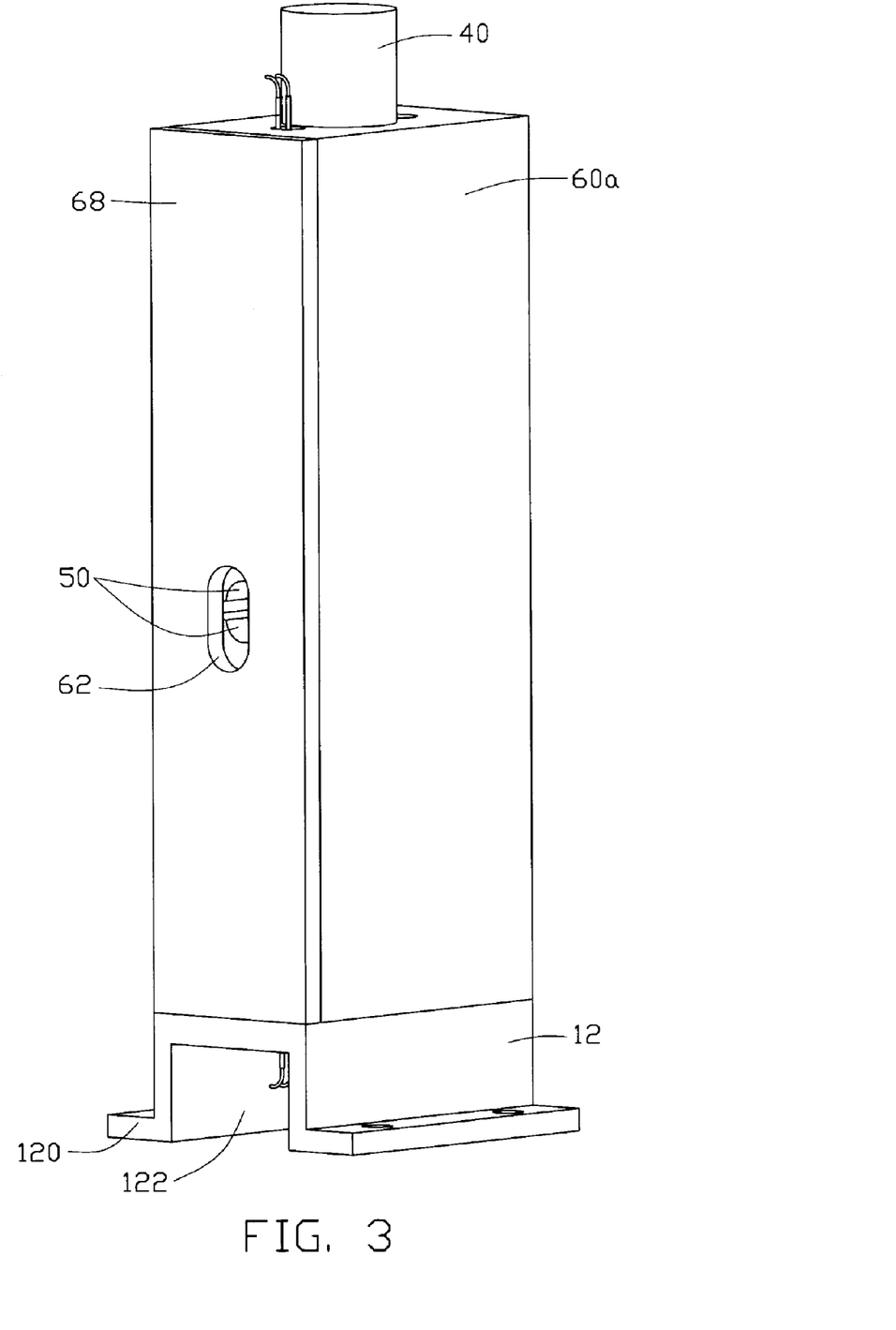
FIG. 3 is an assembled view of a performance testing apparatus for heat pipes in accordance with an alternative embodiment of the present invention.
Figure 4:
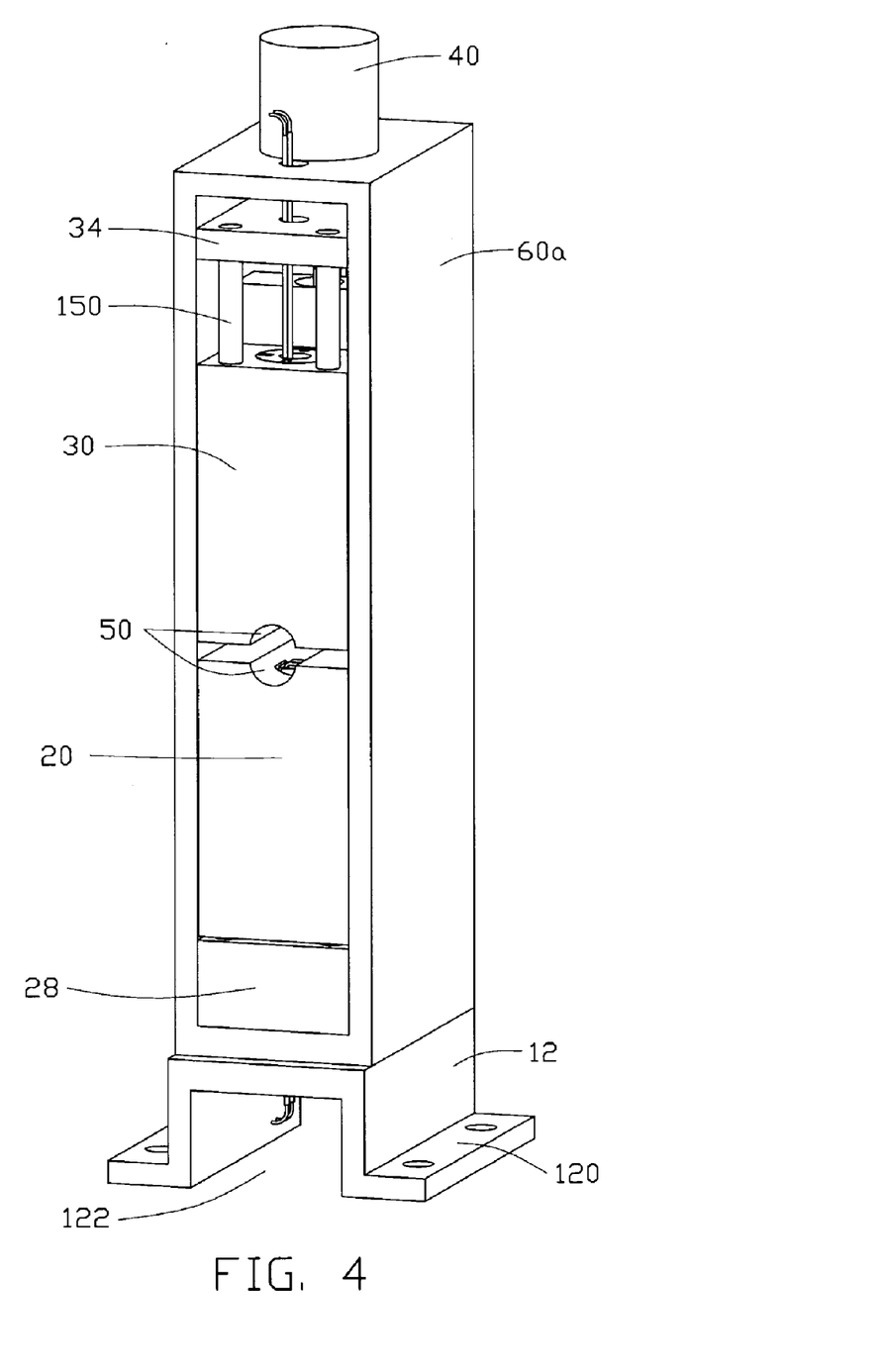
FIG. 4 shows the testing apparatus of FIG. 3 from another aspect, wherein a door board of the testing apparatus is removed.
Figure 5:
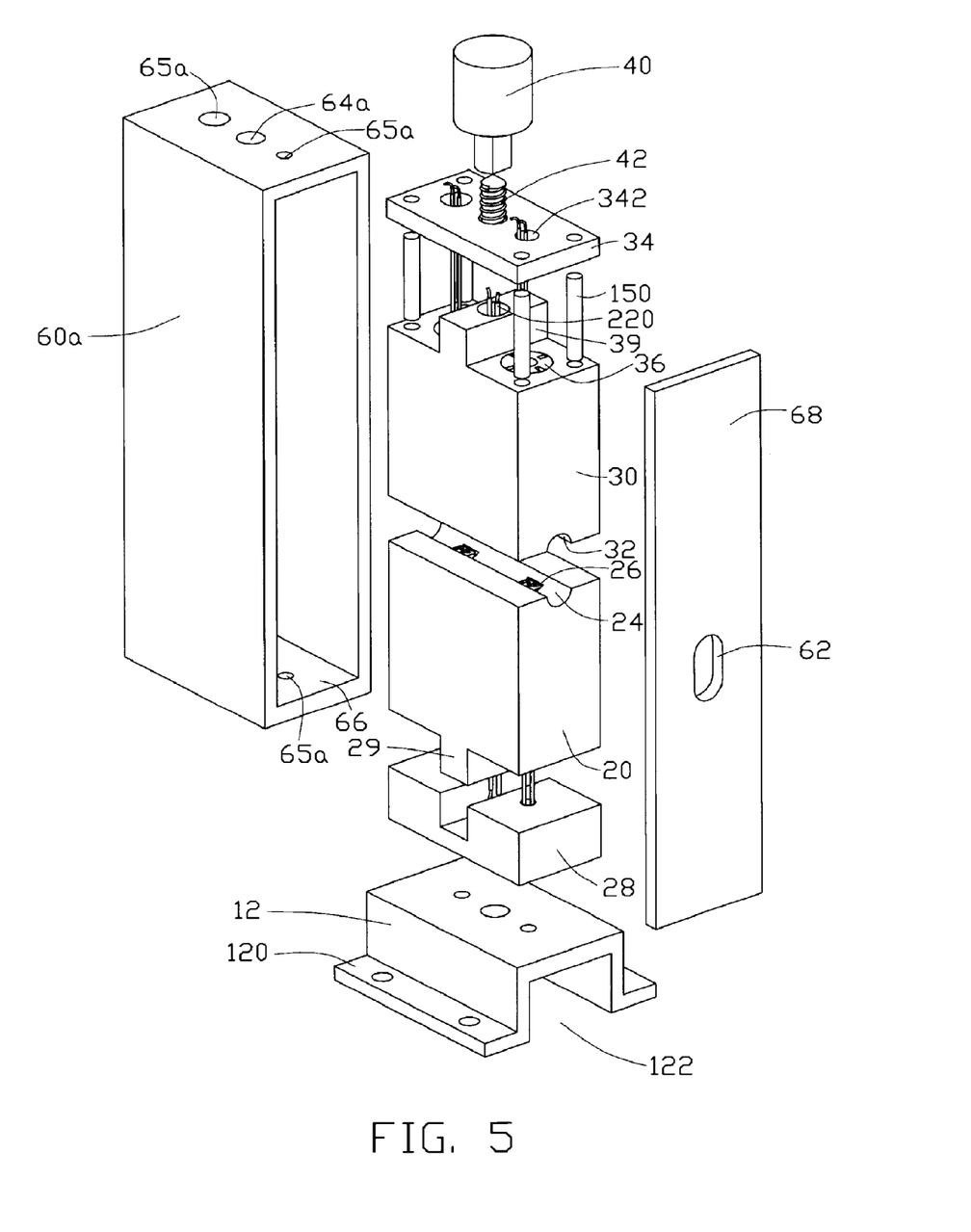
FIG. 5 is an exploded, isometric view of the testing apparatus of FIG. 3.

Referring to FIGS. 3-5, a performance testing apparatus for heat pipes in accordance with an alternative embodiment of the present invention is shown. The testing apparatus in accordance with the alternative embodiment is similar to that of the previous preferred embodiment; the main difference therebetween is that the alternative embodiment has an enclosure 60a including a bottom wall 66 directly sitting on the first plate (not labeled) of the seat 12. The enclosure 60a comprises three interconnecting sidewalls extending upwardly from the bottom 66, thereby defining an opened side (not shown) for facilitating the immovable portion 20 and the movable portion 30 being disposed in or removed from the enclosure 60a. The opened side is closed by a door board 68 removably attached to the enclosure 60a after the immovable portion 20 and the movable portion 30 are mounted in the enclosure 60a. Corresponding to the channel 50, the door board 68 defines an opening 62 from which the evaporating section of the heat pipe is disposed/extracted into/away from the channel 50. A top wall (not labeled) of the enclosure 60a defines a through hole 64a for the shaft of the driving device 40 to extend therethrough. Two apertures 65a are defined at two sides of the through hole 64a in the top wall to allow the wires of the temperature sensors 36 and the wires 220 of the second heating member to extend therethrough to connect with the monitoring computer and the power supply. The bottom 66 defines two through apertures 65a (only one is shown in FIG. 5) to allow the wires of the temperature sensors 26 to extend therethrough to connect with the monitoring computer, and a central hole (not shown) to allow the wire (not labeled) of the first heating member of the immovable portion 20 to extend therethrough to connect with the power supply. The driving device 40 is fixed to the top wall of the enclosure 60a. The shaft of the driving device 40 extends through the hole 64a and threadedly engages with the bolt 42 secured to a board 34 of the movable portion 30. The board 34 is positioned over the movable portion 30. Four columns 150 are secured at corresponding four corners of the movable portion 30 and extend upwardly to engage in corresponding four through holes (not labeled) defined in four corners of the board 34. A space (not labeled) is defined between the board 34 and the top wall of the enclosure 60a for movement of the movable portion 30. When the driving device 40 operates, the shaft rotates, the bolt 42 with the board 34, and the movable portion 30 slide along inner faces of the sidewalls of the enclosure 60a upwardly or downwardly relative to the immovable portion 20 in the enclosure 60a. The board 34 defines two holes 342 therein for extension of the wires of the sensors 36 and the wires 220 of the second heating member.

Additionally, in the present invention, in order to lower cost of the testing apparatus, the insulating member 28, the board 34 and the enclosure 60, 60a can be made from low-cost material such as PE (Polyethylene), ABS (Acrylonitrile Butadiene Styrene), PF(Phenol-Formaldehyde), PTFE (Polytetrafluoroethylene) and so on. The immovable portion 20 and movable portion 30 can be made from copper (Cu) or aluminum (Al). The immovable portion 20 and movable portion 30 can have silver (Ag) or nickel (Ni) plated on inner faces defining the grooves 24, 32 to prevent the oxidization of the inner faces.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A performance testing apparatus for a heat pipe and a supporting frame for positioning the testing apparatus comprising:

an immovable portion having a first heating member located therein for heating an evaporating section of the heat pipe;

a movable portion capable of moving relative to the immovable portion and having a second heating member located therein for heating the evaporating section of the heat pipe;

a receiving structure being defined between the immovable portion and the movable portion for receiving the evaporating section of the heat pipe therein;

at least one temperature sensor being attached to at least one of the immovable portion and the movable portion for thermally contacting the evaporating section of heat pipe in the receiving structure for detecting temperature of the evaporating section of the heat pipe;

an enclosure enclosing the immovable portion and the movable portion therein and having sidewalls thereof slidably contacting at least one of the immovable portion and the movable portion; and a supporting frame having a seat for locating the testing apparatus at a required position;

wherein the receiving structure is a channel defined between the immovable portion and the movable portion, and wherein the at least one temperature sensor has a portion thereof exposed to the channel to detect the temperature of the heat pipe; and wherein the seat has a first plate to have the immovable portion located thereon, and wherein the supporting frame comprises a second plate located above the movable portion and supported by a plurality rods extending from the first plate.

2. The testing apparatus and supporting frame of claim 1, wherein the channel is cooperatively defined by a heating groove defined in a face of the immovable portion and a heating groove defined in a face of the movable portion.

3. The testing apparatus and supporting frame of claim 1, wherein the enclosure has at least one of the sidewalls thereof defining an opening corresponding to the channel for disposing the heat pipe into the channel therefrom.

4. The testing apparatus and supporting frame of claim 1, wherein the enclosure is located between the first and second plates of the supporting frame, and has a top wall thereof connecting the movable portion together via a plurality of columns engaging with the top wall and the movable portion.

5. The testing apparatus and supporting frame of claim 4, wherein the enclosure has the sidewalls thereof slidably contacting side faces of the immovable portion.

6. The testing apparatus of and supporting frame claim 4 further comprising a driving device for driving the movable portion to move away and toward the immovable portion, wherein the driving device is mounted on the second plate of the supporting frame and connects with the movable portion and the top wall of the enclosure via a bolt.

7. The testing apparatus and supporting frame of claim 4, wherein an insulating plate is sandwiched between the immovable portion and the first plate of the supporting frame.

8. The testing apparatus and supporting frame of claim 1, wherein the enclosure has a bottom wall sitting on the seat of the supporting frame, and a top wall thereof positioned over the movable portion.

9. The testing apparatus and supporting frame of claim 8, wherein the enclosure has a door board removably attached thereto for facilitating the movable portion and the immovable portion entering and exiting the enclosure, the door board defining an opening corresponding to the channel for disposing the heat pipe into the channel therefrom.

10. The testing apparatus and supporting frame of claim 8, wherein the movable portion has a board positioned thereover and connects the board together via a plurality of columns engaging with the board and the movable portion.

11. The testing apparatus and supporting frame of claim 10 further comprising a driving device located on a top wall of the enclosure, wherein the driving device engages with a bolt secured to the board of the movable portion, and wherein a space is left between the top wall and the board for movement of the movable portion.

12. The testing apparatus and supporting frame of claim 1, wherein the first heating member of the immovable portion is accommodated in a hole defined in the immovable portion, and extends two wires to connect with a power supply.

13. The testing apparatus and supporting frame of claim 12, wherein immovable portion sits on a bottom of the enclosure, the two wires of the first heating member extending through the bottom of the enclosure.

14. A performance testing apparatus for a heat pipe comprising:

an immovable portion having a first heating member located therein for heating an evaporating section of the heat pipe;

a movable portion capable of moving relative to the immovable portion and having a second heating member located therein for heating the evaporating section of the heat pipe;

a receiving structure being defined between the immovable portion and the movable portion for receiving the evaporating section of the heat pipe therein;

at least one temperature sensor being attached to at least one of the immovable portion and the movable portion for thermally contacting the evaporating section of heat pipe in the receiving structure for detecting temperature of the evaporating section of the heat pipe; and an enclosure enclosing the immovable portion and the movable portion therein and having sidewalls thereof slidably contacting at least one of the immovable portion and the movable port ion;

wherein the first heating member of the immovable portion is accommodated in a hole defined in the immovable portion, and extends two wires to connect with a power supply; and wherein immovable portion sits on a bottom of the enclosure, the two wires of the first heating member extending through the bottom of the enclosure.

15. A performance testing apparatus for a heat pipe and a supporting frame for positioning the testing apparatus comprising:

an immovable portion having a first heating member located therein for heating an evaporating section of the heat pipe;

a movable portion capable of moving relative to the immovable portion and having a second heating member located therein for heating the evaporating section of the heat pipe;

a receiving structure being defined between the immovable portion and the movable portion for receiving the evaporating section of the heat pipe therein;

at least one temperature sensor being attached to at least one of the immovable portion and the movable portion for thermally contacting the evaporating section of heat pipe in the receiving structure for detecting temperature of the evaporating section of the heat pipe;

an enclosure enclosing the immovable portion and the movable portion therein and having sidewalls thereof slidably contacting at least one of the immovable portion and the movable portion; and a supporting frame having a seat for locating the testing apparatus at a required position;

wherein the receiving structure is a channel defined between the immovable portion and the movable portion, and wherein the at least one temperature sensor has a portion thereof exposed to the channel to detect the temperature of the heat pipe; and wherein the enclosure has a bottom wall sitting on the seat of the supporting frame, and a top wall thereof positioned over the movable portion.

* * * * *

UNITED STATES PATENT AND TRADEMARK OFFICE
CERTIFICATE OF CORRECTION

PATENT NO. : 7,611,276 B2
APPLICATION NO. : 11/309599
DATED : November 3, 2009
INVENTOR(S) : Liu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 409 days.

Signed and Sealed this

Twelfth Day of October, 2010

David J. Kappos
*Director of the United States Patent and Trademark Office*